United States Patent

Watanabe et al.

[11] Patent Number: 5,198,923
[45] Date of Patent: Mar. 30, 1993

[54] OPTICAL ISOLATOR

[75] Inventors: Toshiaki Watanabe; Toshihiko Ryuo, both of Gunma, Japan

[73] Assignee: Shin-Etsu Chemical Co., Ltd., Tokyo, Japan

[21] Appl. No.: 821,698

[22] Filed: Jan. 16, 1992

[30] Foreign Application Priority Data

Jan. 17, 1991 [JP] Japan .................. 3-004062
Jan. 31, 1991 [JP] Japan .................. 3-011057

[51] Int. Cl.$^5$ .................. G02F 1/00; G02F 1/09; G02B 5/30; H01F 1/00
[52] U.S. Cl. .................. 359/324; 359/282; 359/484; 252/62.57
[58] Field of Search ........... 359/282, 283, 324, 484; 252/62.57

[56] References Cited

U.S. PATENT DOCUMENTS

| | | | |
|---|---|---|---|
| 3,516,726 | 6/1970 | Dillon, Jr. ................ | 359/324 |
| 4,604,577 | 8/1986 | Matsumura et al. ......... | 359/324 |
| 4,932,760 | 6/1990 | Arii et al. ................ | 359/324 |
| 4,981,341 | 1/1991 | Brandle, Jr. et al. ........ | 359/484 |

FOREIGN PATENT DOCUMENTS

| | | | |
|---|---|---|---|
| 0408250 | 1/1991 | European Pat. Off. ........ | 359/324 |
| 0134404 | 7/1985 | Japan ..................... | 359/282 |
| 2091611 | 3/1990 | Japan ..................... | 359/484 |
| 3-282414 | 12/1991 | Japan ..................... | 359/324 |

Primary Examiner—Bruce Y. Arnold
Assistant Examiner—Evelyn A. Lester
Attorney, Agent, or Firm—McAulay Fisher Nissen Goldberg & Kiel

[57] ABSTRACT

The optical isolator of the present invention comprises a polarizer, a Farady rotator and an analyzer arranged in this order, wherein the Farady rotator has a garnet crystalline structure represented by the formula $(Tb_{1-(a+b)} Ln_a Bi_b)_3 (Fe_{1-c} M_c)_5 O_{12}$ wherein Ln represents at least one element selected from the group consisting of rare earth elements other than Tb; $0 < a \leq 0.6$; $0 < b \leq 0.2$; M represents at least one element selected from the group consisting of Al and Ga; and $0 \leq c < 0.1$; or the formula $(Tb_{1-(d+e+b)} Ln_d Eu_e Bi_b)_3 (Fe_{1-c} M_c)_5 O_{12}$ wherein Ln represents at least one element selected from the group consisting of rare earth elements other than Tb and Eu; $0 < d < 0.6$; $0 < e \leq 0.2$; $0 < d+e \leq 0.6$; $0 < b \leq 0.2$; M represents at least one element selected from the group consisting of Al and Ga; and $0 \leq C < 0.1$; or the formula $(Y_{1-(a+b)} Ln_a Bi_b)_3 (Fe_{1-(c+d)} M_c Ti_d)_5 O_{12}$ wherein Ln represents at least one element selected from the group consisting of Er, Tm, Yb and Lu; $0 < a \leq 0.4$; $0 < b \leq 0.1$; M represents at least one element selected from the group consisting of Al and Ga; $0 \leq c \leq 0.1$; $0 \leq d \leq 0.01$.

6 Claims, 2 Drawing Sheets

OPTICAL ISOLATOR

BACKGROUND OF THE INVENTION

The present invention relates to an optical isolator which is an optical communication system and an optical measuring instrument and which is used for preventing light rays emitted from a light source and made incident upon an optical system from being reflected back to the light source at the end face of the optical system.

When light rays emitted from a light source are to be transmitted through an optical system, part of the light rays are reflected at the end face of the optical system and returned back to the light source. For instance, in transmitting an optical signal through an optical fiber, a light beam emitted from a laser light source is projected onto the end face of the optical fiber through a lense and the majority thereof is transmitted through the optical fiber as transmitted light beam, but a part thereof is surface-reflected at the end faces of the lense and the optical fiber and returned back to the laser light source. The reflected light is again reflected at the surface of the laser light source to thus make noises.

To eliminate such noises, there has been used an optical isolator. The optical isolator comprises, as shown in FIG. 1, a polarizer 1, a Farady rotator 3 and an analyzer 2 which are arranged in this order. The polarizer 1 has a polarization direction indicated by an arrow z. The Farady rotator 3 is positioned in a magnetic field S→N and rotates the plane of polarization of the transmitted light at an angle of 45° clockwise as viewed from the incident light side (counterclockwise direction if it is observed from the outgoing beam side). The analyzer 2 has a polarization direction which is rotated at an angle of 45° with respect to the polarizer 1 as indicated by an arrow y→z.

Only the polarized light rays among the light beam O from the light having a plane of polarization along an arrow Oy can pass through the polarizer 1, then the plane of polarization is rotated at an angle of 45° by the action of the Farady rotator 3 and is in agreement with the polarization direction y→z of the analyzer 2. Therefore, the polarized light can pass through the analyzer 2. The majority of the transmitted light beam O (having a plane of polarization Oy→z) is made incident upon the subsequent optical system such as an optical fiber (not shown), while a part thereof is surface-reflected at the end face of the optical fiber. The reflected light rays R (having a plane of polarization Ry→z) pass through the analyzer 2 in the direction opposite to the foregoing incident light rays and the plane of polarization thereof is counterclockwise rotated at an angle of 45° by the action of the Farady rotator 3. For this reason, the reflected light cannot pass through the polarizer 1 since the plane of polarization is perpendicular to that of the polarizer 1 and the polarizer thus has a light-extinction ability to thereby prevent the reflected light R from making noises.

There has been investigated wavelength multiplex communication in accordance with requirements for high speed transmission and large capacity communication in the recent optical communication systems. Optical isolators used therein must be effective for any wavelength ranges if light rays of a plurality of wavelength ranges pass through it. However, Farady rotators 3 used in the conventional optical isolators have wavelength-dependency in their Farady rotational angles. More specifically, the rotational angle of the plane of polarization thereof varies depending on the wavelengths of the transmitted light rays even if the optical path and the intensity of the magnetic field are maintained at constant levels. For this reason, the light-extinction ability of the optical isolator is greatly influenced by the wavelengths of the transmitted light and, therefore, it is difficult for a single optical isolator to deal with such wavelength multiplex communication.

To deal with wavelength multiplex communication by the use of a single optical isolator, Japanese Patent Provisional Publication Nos. 63-17426 and 63-49728 disclose multi-stage type optical isolators which comprise a plurality of Farady rotators whose rotational angles are different from one another depending on wavelengths. However, the optical isolators as disclosed in the foregoing patents are multi-stage type ones comprising a plurality of Farady rotators and correspondingly suffer from a problem that they have a high insertion loss. Moreover, this is retrograde to the recent requirement for miniaturization of optical communication systems.

SUMMARY OF THE INVENTION

The inventors of this invention have investigated Farady rotators for developing an optical isolator which comprises a polarizer, a Farady rotator and an analyzer arranged in this order, which can cope with the wavelength multiplex communication by itself, exhibits sufficient ability of extinquishing transmitted light having various wavelengths and has a low insertion loss. The inventors have conducted intensive studies of magnetic garnet crystals as a materials for the Farady rotator. As a result, the following conclusions have been obtained.

It has been found out that in the Farady rotator of a magnetic garnet crystal, the wavelength-dependency of the Farady rotational angle thereof varies depending on the kinds of ions which occupy the 24c sites of the crystalline structure thereof. In particular, the garnet whose 24c sites are occurpied by Bi and Tb ions or Bi and Y ions does not cause any substantial variation in the Farady rotational angle depending on the wavelength of transmitted light rays even in the near infrared region.

It is preferred to add ions of other rare earth elements to the foregoing 24c sites so as to coincide the lattice constant of the magnetic garnet crystal with that of a crystalline substrate of paramagnetic garnet as a host material for growing the intended magnetic garnet crystal which is used as a Farady rotator.

When a magnetic garnet crystal having such a structure is used as a Farady rotator, a long optical path is required for obtaining a desired Farady rotational angle, therefore, strong magnetic field should be applied for the optical path but an intensity of a magnetic field required for the saturation of the Farady rotational angle can be diminished through the addition of at least one element selected from Ga and Al.

The inventors of this invention have thus completed the present invention on the basis of the foregoing conclusions.

According to a first embodiment of the optical isolator of the present invention, it comprises a Farady rotator which has a garnet structure represented by the following compositional formula (1):

$$(Tb_{1-(a+b)}Ln_aBi_b)_3(Fe_{1-c}M_c)_5O_{12} \quad (1)$$

In the compositional formula (1), Ln represents at least one element selected from the group consisting of rare earth elements other than Tb; $0 < a \leq 0.6$; $0 < b \leq 0.2$; M represents at least one element selected from the group consisting of Al and Ga; and $0 \leq c < 0.1$.

According to a second embodiment of the optical isolator of the present invention, it comprises a polarizer, a Farady rotator and an analyzer arranged in this order wherein the Farady rotator has a garnet structure represented by the following compositional formula (2):

$$(Tb_{1-(d+e+b)}Ln_dEu_eBi_b)_3(Fe_{1-c}M_c)_5O_{12} \quad (2)$$

Wherein Ln represents at least one element selected from the group consisting of rare earth elements other than Tb and Eu; $0 < d < 0.6$; $0 < e \leq 0.2$; $0 < d+e \leq 0.6$; $0 < b \leq 0.2$; M represents at least one element selected from the group consisting of Al and Ga; and $0 \leq c < 0.1$.

According to a third embodiment of the optical isolator of the present invention, it comprises a polarizer, a Farady rotator and an analyzer arranged in this order wherein the Farady rotator has a garnet structure represented by the following compositional formula (3):

$$(Y_{1-(a+b)}Ln_aBi_b)_3(Fe_{1-(c+d)}M_cTi_d)_5O_{12} \quad (3)$$

Wherein Ln represents at least one element selected from the group consisting of Er, Tm, Yb and Lu; $0 < a \leq 0.4$; $0 < b \leq 0.1$; M represents at least one element selected from the group consisting of Al and Ga; $0 \leq c \leq 0.1$ and $0 \leq d \leq 0.01$.

According to the optical isolator of the present invention, the rotational angle of the plane of polarization thereof remains unchanged even if the wavelength of the transmitted light is changed and accordingly the isolator shows the effect of high light-extinction for transmitted light having various wavelengths. Thus, the isolator of the invention can effectively cope with the wavelength multiplex communication by itself and miniaturize communication systems, shows a sufficient light-extinction ratio with respect to light over a wide wavelength range and has a low insertion loss.

DETAILED EXPLANATION OF THE INVENTION

Figure 1:
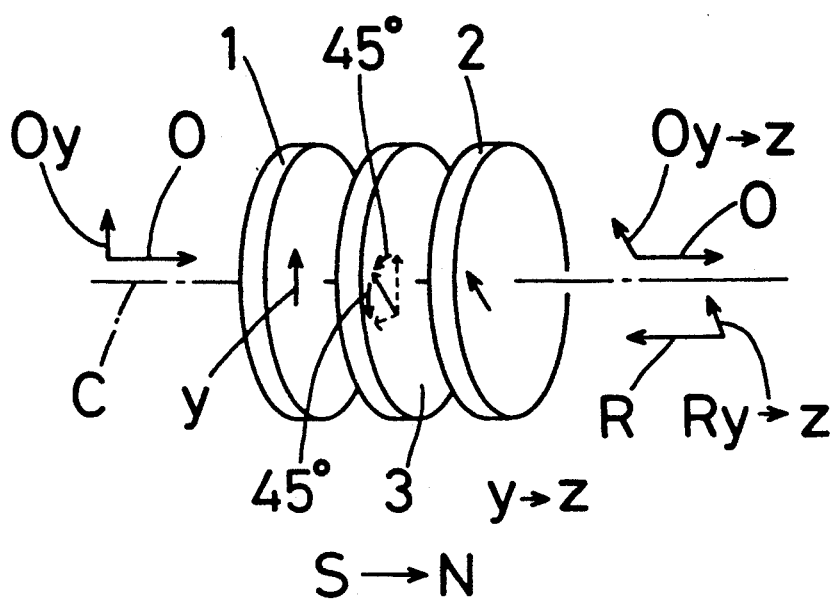
FIG. 1 shows a perspective view for illustrating the principle of operation of an optical isolator.

The optical isolator according to the present invention (see FIG. 1) comprises a polarizer 1, a Farady rotator 3 and an analyzer 2 which are arranged in this order.

The Farady rotator 3 of the optical isolator has a garnet structure represented by the following compositional formula (1);

$$(Tb_{1-(a+b)}Ln_aBi_b)_3(Fe_{1-c}M_c)_5O_{12} \quad (1)$$

In the compositional formula (1), Ln represents at least one element selected from the group consisting of rare earth elements other than Tb; $0 < a \leq 0.6$; $0 < b \leq 0.2$; M represents at least one element selected from the group consisting of Al and Ga; and $0 \leq c < 0.1$.

A long optical path is required for obtaining a desired Farady rotational angle, compared with a third embodiment of the optical isolator, if the magnetic garnet crystal having the compositional formula (1) is used as a material for the Farady rotator. For this reason, the addition of Eu ions is preferred for preventing the reduction of the transmittance thereof.

Therefore, according to another aspect of the present invention, the Farady rotator has a garnet structure represented by the following compositional formula (2):

$$(Tb_{1-(d+e+b)}Ln_dEu_eBi_b)_3(Fe_{1-c}M_c)_5O_{12} \quad (2)$$

In the compositional formula (2), Ln represents at least one element selected from the group consisting of rare earth elements other than Tb and Eu; $0 < d < 0.6$; $0 < e \leq 0.2$; $0 < d+e \leq 0.6$; $0 < b \leq 0.2$; M represents at least one element selected from the group consisting of Al and Ga; and $0 \leq c < 0.1$.

For this reason, according to a further aspect of the present invention, the Farady rotator has a garnet structure represented by the following compositional formula (3):

$$(Y_{1-(a+b)}Ln_aBi_b)_3(Fe_{1-(c+d)}M_cTi_d)_5O_{12} \quad (3)$$

In the compositional formula (3), Ti is added for improving the light transmittance (or reducing the insertion loss) of the magnetic garnet crystal.

In this compositional formula (3), Ln represents at least one element selected from the group consisting of Er, Tm, Yb and Lu; $0 < a \leq 0.4$; $0 < b \leq 0.1$; M represents at least one element selected from the group consisting of Al and Ga; $0 \leq c \leq 0.1$; and $0 \leq d \leq 0.01$.

The Farady rotator 3 has a garnet crystalline structure which is grown on a garnet substrate.

The Farady rotator 3 comprises a plurality of the garnet crystalline structures represented by the compositional formula (1), (2) or (3). Each garnet crystalline structure has thickness film required for obtaining a desired Farady rotational angle, antireflection coatings are applied onto both end faces of each garnet crystalline structure.

The polarizer 1 and analyzer 2 are not restricted to specific ones, but there may be used, for instance, a glass polarizing plate for optical isolators having polarization-dependency or a birefringent crystal for optical isolators independent of polarization.

Since the Farady rotator 3 used in the optical isolator of the present invention comprises garnet crystalline structures represented by the compositional formula (1), (2) or (3), the rotational angle of the plane of polarization of the Farady rotator is maintained almost at a constant level even if the wavelength of light transmitting therethrough is changed to some extent. Therefore, the optical isolator shows sufficient light-extinction ability, by itself, for light of various wavelengths. Further, the intensity of a saturated magnetic field required for the saturation of the Farady rotational angle can be reduced and this permits the miniaturization of a magnet for applying a magnetic field to the Farady rotator and the miniaturization of an optical isolator.

In particular, the crystal having the compositional formula (2) or (3) is excellent in light transmittance and hence an optical isolator in which the Farady rotator 3 obtained from such a crystal is incorporated has accordingly an extremely low insertion loss.

The garnet crystal having the composition represented by the formula (1), (2) or (3) is grown in accordance with liquid phase epitaxy technique. It is difficult to obtain a uniform large crystal and the resulting crystal cannot be cut in such a manner that the direction of the optical path of the Farady rotator 3 is in agreement with the crystal growth direction as in the conventional crystals, if the temperature of a melt for growing a crystal and the lattice constant cause variations in the course of the crystal growth in the liquid phase epitaxy technique. For this reason, the crystal should be cut in such a manner that the direction of the optical path of the Farady rotator 3 meets the crystal growth direction. Thus, Farady rotators having a desired size can be obtained even from crystals insufficiently grown. Moreover, a plurality of small garnet crystals can be stacked together to give a Farady rotator having a desired size.

The present invention will be explained in more detail with reference to the following Examples and the effect of the present invention will also be discussed in detail comparison with Comparative Examples given below.

EXAMPLE 1

A crystal of $Tb_{2.58}Lu_{0.20}Bi_{0.22}Fe_5O_{12}$ was grown and deposited on a 25 mmΦ plane of a paramagnetic garnet substrate having a size of 25 mmΦ×0.4 mmt through liquid phase epitaxy technique in a thickness of about 1000 μm. The resulting crystal was cut to give a piece of a desired size, then ground to give a crystalline piece having a size of 1 mmΦ×3.98 mmt, followed by mirror finishing of the plane of 1 mm Φ and application of an anti reflection coating onto the mirror-polished plane to thus give a Farady rotator. The resulting Farady rotator was subjected to determination of the rotational angles of the plane of polarization for light rays having wavelengths (λ) of 1310 nm and 1550 nm in a magnetic field having an intensity of 1200 Oe and they were both found to be 45°.

Moreover, an optical isolator was made on an experimental basis by arranging a polarizer 1, the Farady rotator 3 thus obtained and an analyzer 2 in this order as shown in FIG. 1. Both polarizer 1 and analyzer 2 used were glass polarizing plates.

Figure 2:
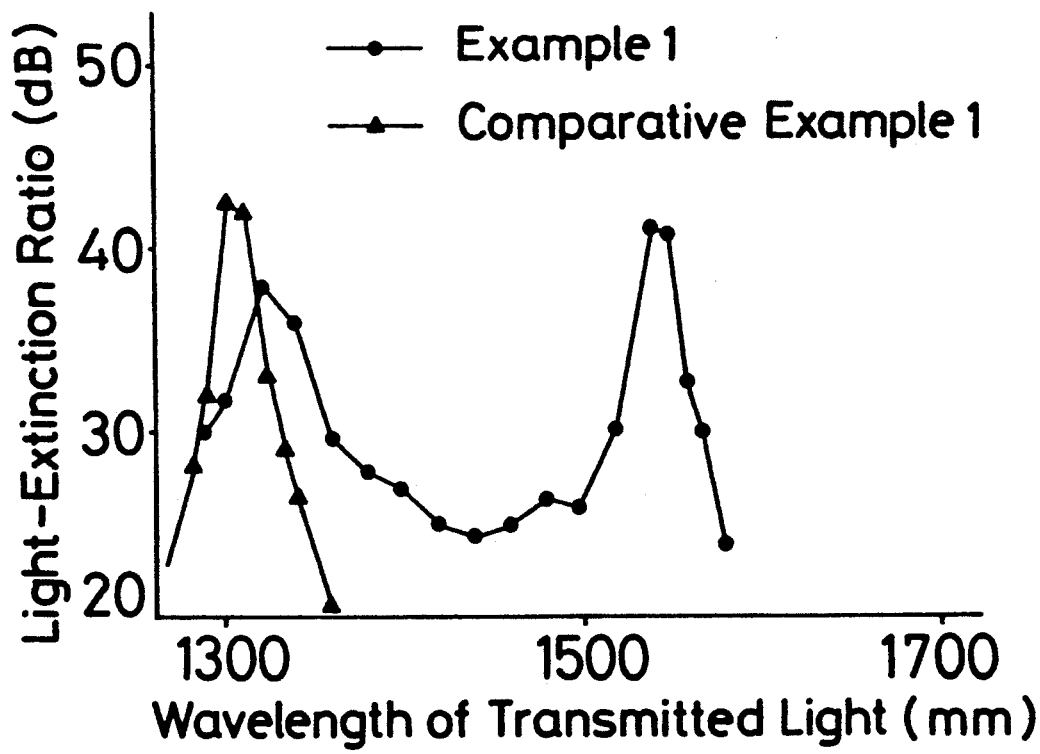
FIG. 2 is a diagram showing the results of light-extinction ratio observed on the optical isolators of Example 1 and Comparative Example 1.

A magnetic field having the same intensity used above was applied to the resulting optical isolator to determine the light-extinction ratio (i.e., the rate of blockage of the light, which was reflected back to the isolator after transmitting through the isolator, by the isolator) and the insertion loss (the loss of transmitted light due to the insertion of the optical isolator in an optical system). The results of light-extinction ratio thus obtained are plotted in FIG. 2. The light-extinction ratio and the insertion loss for the light having a wavelength of 1310 nm were 41 dB and 0.5 Db respectively. On the other hand, those for the light of a wavelength of 1550 nm were 38 dB and 0.55 dB respectively. As seen from the data plotted in FIG. 2, the light-extinction ratio of not less than 30 dB could be obtained within the wavelength ranges of from 1290 to 1360 nm and from 1520 to 1570 nm.

COMPARATIVE EXAMPLE 1

A crystal of $Gd_{2.00}Bi_{1.00}Fe_5O_{12}$ was grown and deposited on a 25 mmΦ plane of a paramagnetic garnet substrate having a size of 25 mmΦ×0.4 mmt through liquid phase epitaxy technique in a thickness of about 220 μm. The resulting crystal was cut to give a piece of a desired size, then ground to give a crystalline piece having a size of 1 mmΦ×0.2 mmt, followed by mirror finishing of the plane of 1 mm Φ and application of an antireflection coating onto the mirror-polished plane to thus give a Farady rotator. The resulting Farady rotator was subjected to determination of the rotational angles of the plane of polarization for light rays having wavelengths (λ) of 1310 nm and 1550 nm in a magnetic field having an intensity of 1200 Oe and they were found to be 44.7° and 29.8° respectively.

Moreover, an optical isolator as shown in FIG. 1 was made on an experimental basis while making use of the Farady rotator thus obtained. Both polarizer 1 and analyzer 2 used were glass polarizing plates. A magnetic field having the same intensity used above was applied to the resulting optical isolator to determine the light-extinction ratio and the insertion loss. The light-extinction ratio and the insertion loss for the light having a wavelength of 1310 nm were 42 dB and 0.5 dB respectively. On the other hand, those for the light of a wavelength of 1550 nm were not more than 25 dB and 1.2 dB respectively. The results of light-extinction ratio-determination thus performed are plotted in FIG. 2.

EXAMPLE 2

A crystal of $Tb_{2.5}Yb_{0.2}Bi_{0.3}Fe_{4.9}Ga_{0.1}O_{12}$ was grown and deposited on a 50 mmΦ plane of a paramagnetic garnet substrate having a size of 50 mm Φ×0.5 mmt through liquid phase epitaxy technique in a thickness of about 1100 μm. The resulting crystal was cut into pieces of a desired size, then ground to give crystalline pieces having a size of 3 mmΦ×1 mmt, followed by mirror finishing of the plane of 3 mm Φ and application of an antireflection coating onto the mirror-polished plane. The resulting two crystalline pieces were closely contact with one another to give a Farady rotator. The resulting Farady rotator was subjected to determination of the rotational angle of the plane of polarization for light having a wavelength (λ) of 1550 nm in a magnetic field having an intensity of 1000 Oe and it was found to be equal to 45°.

Figure 3:
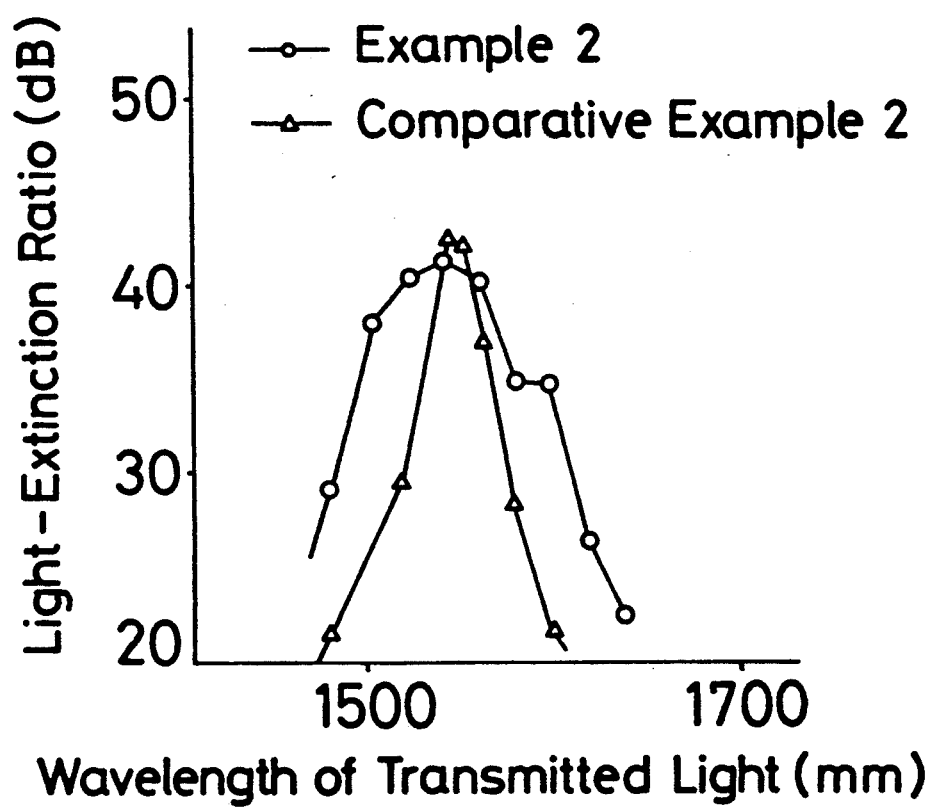
FIG. 3 is a diagram showing the results of light-extinction ratio observed on the optical isolators of Example 2 and Comparative Example 2.

Moreover, an optical isolator as shown in FIG. 1 was made on an experimental basis while making use of the Farady rotator thus obtained. Both polarizer 1 and analyzer 2 used were glass polarizing plates. A magnetic field having the same intensity used above was applied to the resulting optical isolator to determine the light-extinction ratio and the insertion loss which were 41 dB and 0.4 dB respectively for the light of a wavelength of 1550 nm. The results of light-extinction ratio thus obtained are plotted in FIG. 3. As seen from the results plotted in FIG. 3, this optical isolator shows good light-extinction ability over a wide wavelength range. The light-extinction ratio of not less than 30 dB could be obtained within the wavelength range of from 1490 to 1610 nm.

COMPARATIVE EXAMPLE 2

A crystal of $Y_{1.55}Bi_{1.45}Fe_5O_{12}$ was grown and deposited on a 50 mmΦ plane of a paramagnetic garnet substrate having a size of 50 mmΦ×0.4 mmt through liquid phase epitaxy technique on a thickness of about 220 μm. The resulting crystal was cut to give a piece of a desired size, then ground to give a crystalline piece having a size of 3 mmΦ×0.2 mmt, followed by mirror finishing of the plane of 3 mm Φ and application of an antireflection coating onto the mirror-polished plane to give a Farady rotator. The resulting Farady rotator was subjected to determination of the rotational angle of the plane of polarization for light having a wavelength ($\lambda$) of 1550 nm in a magnetic field having an intensity of 1000 Oe and it was found to be 44.8°.

Moreover, an optical isolator as shown in FIG. 1 was made on an experimental basis while making use of the Farady rotator thus obtained. Both polarizer 1 and analyzer 2 used were glass polarizing plates. A magnetic field having the same intensity used above was applied to the resulting optical isolator to determine the light-extinction ratio and the insertion loss which were 42 dB and 0.4 dB respectively for the light of a wavelength of 1550 nm. The results of light-extinction ratio-determination thus performed are plotted in FIG. 3. As seen from the results plotted in FIG. 3, the light-extinction ratio of not less than 30 dB could be attained only in a wavelength range of from 1530 to 1575 nm.

EXAMPLE 3

A crystal of $Tb_{2.0}Eu_{0.2}Lu_{0.3}Bi_{0.5}Fe_{4.9}Ga_{0.1}O_{12}$ was grown and deposited on a 25 mm$\Phi$ plane of a paramagnetic garnet substrate having a size of 25 mm $\Phi \times 0.4$ mmt through liquid phase epitaxy technique in a thickness of about 900 $\mu$m. The resulting crystal was cut to give a piece of a desired size, then ground to give a crystalline piece having a size of 3 mm $\Phi \times 0.87$ mmt, followed by mirror finishing of the plane of 3 mm $\Phi$ and application of an antireflection coating onto the mirror-polished plane to thus give a Farady rotator. The resulting Farady rotator was subjected to determination of the rotational angle of the plane of polarization for light having a wavelength ($\lambda$) of 1550 nm in a magnetic field having an intensity of 1300 Oe and it was found to be 45°.

Moreover, an optical isolator as shown in FIG. 1 was made on an experimental basis using the Farady rotator thus obtained. Both polarizer 1 and analyzer 2 used were glass polarizing plates. A magnetic field having the same intensity used above was applied to the resulting optical isolator to determine the light-extinction ratio and the insertion loss. The light-extinction ratio and the insertion loss for the light having a wavelength of 1550 nm were 41 dB and 0.15 dB respectively. The optical isolator showed good light-extinction ratio over a wide wavelength range. The light-extinction ratio of not less than 30 dB could be obtained over a wavelength range of from 1510 to 1720 nm.

EXAMPLE 4

A crystal of $Tb_{0.9}Y_{1.8}Bi_{0.3}Fe_{5.0}O_{12}$ was grown and deposited on a 25 mm$\Phi$ plane of a paramagnetic garnet substrate having a size of 25 mm$\Phi \times 0.4$ mmt through liquid phase epitaxy technique in a thickness of about 1000 $\mu$m. The resulting crystal was cut to give a piece, then ground to give a crystalline piece having a size of 1 mm $\Phi \times 2.17$ mmt, followed by mirror finishing of the plane of 1 mm$\Phi$ and application of an antireflection coating onto the mirror-polished plane to thus give a Farady rotator. The resulting Farady rotator was subjected to determination of the rotational angle of the plane of polarization for light having a wavelength ($\lambda$) of 1550 nm in a magnetic field having an intensity of 1600 Oe and it was found to be 45°.

Moreover, an optical isolator as shown in FIG. 1 was made on an experimental basis using the Farady rotator thus obtained. Both polarizer 1 and analyzer 2 used were glass polarizing plates. A magnetic field having the same intensity used above was applied to the resulting optical isolator to determine the light-extinction ratio and the insertion loss. The light-extinction ratio and the insertion loss for the light having a wavelength of 1550 nm were 43 dB and 0.45 dB respectively. The optical isolator showed good light-extinction ratio over a wide wavelength range. The light-extinction ratio of not less than 30 dB could be obtained over a wavelength range of from 1520 to 1590 nm.

EXAMPLE 5

A crystal of $Tb_{1.35}Y_{1.35}Bi_{0.3}Fe_5O_{12}$ was grown and deposited on a 25 mm$\Phi$ plane of a paramagnetic garnet substrate having a size of 25 mm$\Phi \times 0.4$ mmt through liquid phase epitaxy technique in a thickness of about 1500 $\mu$m. The resulting crystal was cut to give a piece, then ground to give a crystalline piece having a size of 1.5 mm $\Phi \times 2.09$ mmt, followed by mirror finishing of the plane of 1.5 mm$\Phi$ and application of an antireflection coating onto the mirror-polished plane to thus give a Farady rotator. The resulting Farady rotator had a rotational angle of the plane of polarization for light having a wavelength ($\lambda$) of 1550 nm equal to 45° in a magnetic field of 1600 Oe.

Moreover, an optical isolator as shown in FIG. 1 was made on an experimental basis using the Farady rotator thus formed. Both polarizer 1 and analyzer 2 used were glass polarizing plates. A magnetic field having the same intensity used above was applied to the resulting optical isolator to determine the light-extinction ratio and the insertion loss which were found to be 41 dB and 0.4 dB respectively for the light having a wavelength of 1550 nm. The optical isolator showed good light-extinction ratio over a wide wavelength range. The light-extinction ratio of not less than 30 dB could be obtained over a wavelength range of from 1510 to 1690 nm.

EXAMPLE 6

A crystal of $Tb_{1.8}Y_{0.9}Bi_{0.3}Fe_{4.8}Ga_{0.2}O_{12}$ was grown and deposited on a 25 mm$\Phi$ plane of a paramagnetic garnet substrate having a size of 25 mm $\Phi \times 0.5$ mmt through liquid phase epitaxy technique in a thickness of about 2130 $\mu$m. The resulting crystal was cut to give a piece, then ground to give a crystalline piece having a size of 3 mm$\Phi \times 2$ mmt, followed by mirror finishing of the plane of 3 mm $\Phi$ and application of an antireflection coating onto the mirror-polished plane to thus give a Farady rotator. The resulting Farady rotator had a rotational angle of the plane of polarization for light having a wavelength ($\lambda$) of 1550 nm equal to 45° in a magnetic field of 1200 Oe.

Moreover, an optical isolator as shown in FIG. 1 was made on an experimental basis using the Farady rotator thus obtained. Both polarizer 1 and analyzer 2 used were glass polarizing plates. A magnetic field having the same intensity used above was applied to the resulting optical isolator to determine the light-extinction ratio and the insertion loss which were found to be 42 dB and 0.4 dB respectively for the light having a wavelength of 1550 nm. The optical isolator showed good light-extinction ratio over a wide wavelength range. The light-extinction ratio of not less than 30 dB could be obtained over a wavelength range of from 1500 to 1650 nm.

EXAMPLE 7

A crystal of $Tb_{2.3}Eu_{0.2}Yb_{0.1}Bi_{0.4}Fe_{4.7}Ga_{0.3}O_{12}$ was grown and deposited on a 25 mm$\Phi$ plane of a paramagnetic garnet substrate having a size of 25 mm Φ×0.4 mmt through liquid phase epitaxy technique in a thickness of about 1000 μm. The resulting crystal was cut to give a piece, then ground to give a crystalline piece having a size of 1 mmΦ×1.32 mmt, followed by mirror finishing of the plane of 1 mm Φ and application of an antireflection coating onto the mirror-polished plane to thus give a Farady rotator. The resulting Farady rotator had a rotational angle of the plane of polarization for light having a wavelength (λ) of 1550 nm equal to 45° in a magnetic field of 800 Oe.

Moreover, an optical isolator as shown in FIG. 1 was made on an experimental basis using the Farady rotator thus produced. Both polarizer 1 and analyzer 2 used were glass polarizing plates. A magnetic field having the same intensity used above was applied to the resulting optical isolator to determine the light-extinction ratio and the insertion loss which were found to be 41 dB and 0.15 dB respectively for the light having a wavelength of 1550 nm. The optical isolator showed good light-extinction ratio over a wide wavelength range. The light-extinction ratio of not less than 30 dB could be obtained over a wavelength range of from 1500 to 1670 nm.

EXAMPLE 8

A crystal of $Tb_{2.5}Eu_{0.2}Bi_{0.3}Fe_{4.9}Al_{0.1}O_{12}$ was grown and deposited on a 25 mmΦ plane of a paramagnetic garnet substrate having a size of 25 mm Φ×0.4 mmt through liquid phase epitaxy technique in a thickness of about 1000 μm. The resulting crystal was cut to give a piece, then ground to give a crystalline piece having a size of 1 mmΦ×2.04 mmt, followed by mirror finishing of the plane of 1 mm Φ and application of an antireflection coating onto the mirror-polished plane to thus give a Farady rotator. The resulting Farady rotator had a rotational angle of the plane of polarization for light having a wavelength (λ) of 1550 nm equal to 45° in a magnetic field of 900 Oe.

Moreover, an optical isolator as shown in FIG. 1 was made on an experimental basis using the Farady rotator thus obtained. Both polarizer 1 and analyzer 2 used were crystalline plates of rutile. A magnetic field having the same intensity used above was applied to the resulting optical isolator to determine the light-extinction ratio and the insertion loss which were found to be 40 dB and 0.14 dB respectively for the light having a wavelength of 1550 nm. The optical isolator showed good light-extinction ratio over a wide wavelength range. The light-extinction ratio of not less than 30 dB could be obtained over a wavelength range of from 1495 to 1610 nm.

EXAMPLE 9

A crystal of $Tb_{2.25}La_{0.15}Bi_{0.60}Fe_{4.9}Ga_{0.1}O_{12}$ was grown and deposited on a 25 mmΦ plane of a paramagnetic garnet substrate having a size of 25 mm Φ×0.4 mmt through liquid phase epitaxy technique in a thickness of about 800 μm. The resulting crystal was cut to give a piece, then ground to give a crystalline piece having a size of 3 mmΦ×0.76 mmt, followed by mirror finishing of the plane of 3 mm Φ and application of an antireflection coating onto the mirror-polished plane to thus give a Farady rotator. The resulting Farady rotator had a rotational angle of the plane of polarization for light having a wavelength (λ) of 1550 nm equal to 45° in a magnetic field of 1300 Oe.

Moreover, an optical isolator as shown in FIG. 1 was made on an experimental basis using the Farady rotator thus formed. Both polarizer 1 and analyzer 2 used were glass polarizing plates. A magnetic field having the same intensity used above was applied to the resulting optical isolator to determine the light-extinction ratio and the insertion loss which were found to be 40 dB and 0.5 dB respectively for the light having a wavelength of 1550 nm. The optical isolator showed good light-extinction ratio over a wide wavelength range. The light-extinction ratio of not less than 30 dB could be obtained over a wavelength range of from 1520 to 1590 nm.

COMPARATIVE EXAMPLE 3

A crystal of $Tb_{2.20}La_{0.10}Bi_{0.70}Fe_{4.9}Ga_{0.1}O_{12}$ was grown and deposited on a 25 mmΦ plane of a paramagnetic garnet substrate having a size of 25 mm Φ×0.4 mmt through liquid phase epitaxy technique in a thickness of about 700 μm. The resulting crystal was cut to give a piece, then ground to give a crystalline piece having a size of 3 mmΦ×0.65 mmt, followed by mirror finishing of the plane of 3 mm Φ and application of an antireflection coating onto the mirror-polished plane to thus give a Farady rotator. The resulting Farady rotator had a rotational angle of the plane of polarization for light having a wavelength (λ) of 1550 nm equal to 45° in a magnetic field of 1300 Oe.

Moreover, an optical isolator as shown in FIG. 1 was made on an experimental basis using the Farady rotator thus produced. Both polarizer 1 and analyzer 2 used were glass polarizing plates. A magnetic field having the same intensity used above was applied to the resulting optical isolator to determine the light-extinction ratio and the insertion loss which were found to be 39 dB and 0.5 dB respectively for the light having a wavelength of 1550 nm. The light-extinction ratio of not less than 30 dB could be obtained over a wavelength range of from 1530 to 1575 nm.

EXAMPLE 10

A crystal of $Tb_{2.25}Lu_{0.25}Bi_{0.50}Fe_{4.6}Al_{0.4}O_{12}$ was grown and deposited on a 23 mmΦ plane of a paramagnetic garnet substrate having a size of 23 mm Φ×0.4 mmt through liquid phase epitaxy technique in a thickness of about 1000 μm. The resulting crystal was cut to give a piece, then ground to give a crystalline piece having a size of 1 mmΦ×1.25 mmt followed by mirror finishing of the plane of 1 mm Φ and application of an antireflection coating onto the mirror-polished plane to thus give a Farady rotator. The resulting Farady rotator had a rotational angle of the plane of polarization for light having a wavelength (λ) of 1550 nm equal to 44.8° in a magnetic field of 1300 Oe.

Moreover, an optical isolator as shown in FIG. 1 was made on an experimental basis while making use of the Farady rotator thus formed. Both polarizer 1 and analyzer 2 used were glass polarizing plates. A magnetic field having the same intensity used above was applied to the resulting optical isolator to determine the light-extinction ratio and the insertion loss which were found to be 41 dB and 0.45 dB respectively for the light having a wavelength of 1550 nm. The optical isolator showed good light-extinction ratio over a wide wavelength range. The light-extinction ratio of not less than 30 dB could be obtained over a wavelength range of from 1510 to 1620 nm. Moreover, the isolator showed stable light-extinction ability at an atmospheric temperature ranging from 0° to 60° for the light of 1550 nm.

COMPARATIVE EXAMPLE 4

A crystal of $Tb_{2.30}Lu_{0.20}Bi_{0.50}Fe_{4.5}Al_{0.5}O_{12}$ was grown and deposited on a 23 mm$\Phi$ plane of a paramagnetic garnet substrate having a size of 23 mm $\Phi \times 0.4$ mmt through liquid phase epitaxy technique in a thickness of about 1000 µm. The resulting crystal was cut to give a piece, then ground to give a crystalline piece having a size of 1 mm$\Phi \times 1.38$ mmt, followed by mirror finishing of the plane of 1 mm $\Phi$ and application of an antireflection coating onto the mirror-polished plane to thus give a Farady rotator. The resulting Farady rotator had a magnetic compensating temperature in the vicinity of room temperature and correspondingly the Farady rotational angle thereof was greatly influenced by temperature. For this reason, any optical isolator could not be made on an experimental basis.

EXAMPLE 11

A crystal of $Tb_{0.8}Y_{1.8}Bi_{0.4}Fe_{4.9}Ga_{0.1}O_{12}$ was grown and deposited on a 25 mm$\Phi$ plane of a paramagnetic garnet substrate $(Sm_3Ga_5O_{12})$ having a size of 25 mm$\Phi \times 0.4$ mmt through liquid phase epitaxy technique in a thickness of about 1500 µm. The resulting crystal was cut to give a piece, then ground to give a crystalline piece having a size of 3 mm$\Phi \times 1.47$ mmt, followed by mirror finishing of the plane of 3 mm $\Phi$ and application of an antireflection coating onto the mirror-polished plane to thus give a Farady rotator. The resulting Farady rotator had a rotational angle of the plane of polarization for light having a wavelength ($\lambda$) of 1550 nm equal to 45° in a magnetic field of 1600 Oe.

Moreover, an optical isolator as shown in FIG. 1 was made on an experimental basis using of the Farady rotator obtained above. Both polarizer 1 and analyzer 2 used were glass polarizing plates. A magnetic field having the same intensity used above was applied to the resulting optical isolator to determine the light-extinction ratio and the insertion loss which were found to be 41 dB and 0.45 dB respectively for the light having a wavelength of 1550 nm. The optical isolator showed good light-extinction ratio over a wide wavelength range. The light-extinction ratio of not less than 30 dB could be obtained over a wavelength range of from 1530 to 1585 nm.

COMPARATIVE EXAMPLE 5

A crystal of $Tb_{0.7}Y_{1.9}Bi_{0.4}Fe_{4.9}Ga_{0.1}O_{12}$ was grown and deposited on a 25 mm$\Phi$ plane of a paramagnetic garnet substrate $(Sm_3Ga_5O_{12})$ having a size of 25 mm$\Phi \times 0.4$ mmt through liquid phase epitaxy technique in a thickness of about 1600 µm. The resulting crystal was cut to give a piece, then ground to give a crystalline piece having a size of 3 mm$\Phi \times 1.48$ mmt, followed by mirror finishing of the plane of 3 mm $\Phi$ and application of an antireflection coating onto the mirror-polished plane to thus give a Farady rotator. The resulting Farady rotator had a rotational angle of the plane of polarization for light having a wavelength ($\lambda$) of 1550 nm equal to 44.9° in a magnetic field of 1600 Oe.

Moreover, an optical isolator as shown in FIG. 1 was made on an experimental basis using the Farady rotator produced above. Both polarizer 1 and analyzer 2 used were glass polarizing plates. A magnetic field having the same intensity used above was applied to the resulting optical isolator to determine the light-extinction ratio and the insertion loss which were found to be 40 dB and 0.50 dB respectively for the light having a wavelength of 1550 nm. The light-extinction ratio of not less than 30 dB could be obtained over a wavelength range of from 1530 to 1575 nm.

COMPARATIVE EXAMPLE 6

A crystal of $Tb_{2.6}Bi_{0.4}Fe_{4.9}Ga_{0.1}O_{12}$ was grown and deposited on a 25 mm$\Phi$ plane of a paramagnetic garnet substrate $(Sm_3Ga_5O_{12})$ having a size of 25 mm$\Phi \times 0.4$ mmt through liquid phase epitaxy technique. However, when the thickness of the deposited film exceeded 2 µm, the film was cracked due to a large difference in lattice constant between the film and the substrate and thus there could not be obtained any film having a thickness required for the production of a Farady rotator.

COMPARATIVE EXAMPLE 7

A crystal of $Tb_{3.0}Fe_{5.0}O_{12}$ was grown and deposited on a 25 mm$\Phi$ plane of a paramagnetic garnet substrate having a size of 25 mm $\Phi \times 0.4$ mmt through liquid phase epitaxy technique in a thickness of about 1000 µm. The resulting crystal was cut to give a piece, then ground to give a crystalline piece having a size of 1 mm $\Phi \times 2.50$ mmt, followed by mirror finishing of the plane of 1 mm $\Phi$ and application of an antireflection coating onto the mirror-polished plane to thus give a Farady rotator. The resulting Farady rotator had a rotational angle of the plane of polarization for light having a wavelength ($\lambda$) of 1550 nm equal to 45° in a magnetic field of 1000 Oe.

Moreover, an optical isolator as shown in FIG. 1 was made on an experimental basis using the Farady rotator produced above. Both polarizer 1 and analyzer 2 used were glass polarizing plates. A magnetic field having the same intensity used above was applied to the resulting optical isolator to determine the light-extinction ratio and the insertion loss which were found to be 38 dB and 0.7 dB respectively for the light having a wavelength of 1550 nm. The light-extinction ratio of not less than 30 dB could be obtained over a wavelength range of from 1535 to 1555 nm.

EXAMPLE 12

A crystal of $Y_{2.92}Bi_{0.08}Fe_{4.98}Ti_{0.02}O_{12}$ was grown and deposited on a 25 mm$\Phi$ plane of a paramagnetic garnet substrate having a size of 25 mm$\Phi \times 0.4$ mmt through liquid phase epitaxy technique in a thickness of about 1000 µm. The resulting crystal was cut to give a piece, then ground to give a crystalline piece having a size of 1 mm $\Phi \times 5.70$ mmt, followed by mirror finishing of the plane of 1 mm$\Phi$ and application of an antireflection coating onto the mirror-polished plane to thus give a Farady rotator. The resulting Farady rotator was subjected to the determination of the rotational angles of the plane of polarization for light having a wavelengths ($\lambda$) of 1310 nm and 1550 nm in a magnetic field of 1700 Oe and they were both found to be 45°.

Moreover, an optical isolator as shown in FIG. 1 was made on an experimental basis by arranging a polarizer 1, the Farady rotator 3 thus obtained and analyzer 2 in this order. Both polarizer 1 and analyzer 2 used were glass polarizing plates. A magnetic field having the same intensity used above was applied to the resulting optical isolator to determine the light-extinction ratio and the insertion loss which were found to be 41 dB and 0.5 dB respectively for the light having a wavelength of 1310 nm and 38 dB and 0.55 dB for the light having a wavelength of 1550 nm.

COMPARATIVE EXAMPLE 8

A crystal of $Y_{2.00}Bi_{1.00}Fe_5O_{12}$ was grown and deposited on a 25 mm$\Phi$ plane of a paramagnetic garnet substrate having a size of 25 mm$\Phi \times 0.4$ mmt through liquid phase epitaxy technique in a thickness of about 220 $\mu$m. The resulting crystal was cut to give a piece, then ground to give a crystalline piece having a size of 1 mm$\Phi \times 0.2$ mmt, followed by mirror finishing of the plane of 1 mm $\Phi$ and application of an antireflection coating onto the mirror-polished plane to thus give a Farady rotator. The Farady rotator had rotational angles of the plane of polarization for light having wavelengths ($\lambda$) of 1310 nm and 1550 nm equal to 44.7° and 29.8° respectively in a magnetic field of 1800 Oe.

Moreover, an optical isolator as shown in FIG. 1 was made on an experimental basis using the Farady rotator thus produced. Both polarizer 1 and analyzer 2 used were glass polarizing plates. A magnetic field having the same intensity used above was applied to the resulting optical isolator to determine the light-extinction ratio and the insertion loss which were found to be 42 dB and 0.6 dB respectively for the light having a wavelength of 1310 nm and not more than 25 dB and 1.4 dB for the light having a wavelength of 1550 nm.

EXAMPLE 13

A crystal of $Y_{2.95}Bi_{0.05}Fe_{4.99}Ti_{0.01}O_{12}$ was grown and deposited on a 50 mm$\Phi$ plane of a paramagnetic garnet substrate having a size of 50 mm$\Phi \times 0.5$ mmt through liquid phase epitaxy technique in a thickness of about 1000 $\mu$m. The resulting crystal was cut to give a piece, then ground to give a crystalline piece having a size of 1 mm $\Phi \times 2.50$ mmt, followed by mirror finishing of the 1 mm$\Phi$ plane and application of an antireflection coating onto the mirror-polished plane to thus give a Farady rotator. The resulting Farady rotator had a rotational angle of the plane of polarization for light having a wavelength ($\lambda$) of 1550 nm equal to 45° in a magnetic field of 1700 Oe.

Moreover, an optical isolator as shown in FIG. 1 was made on an experimental basis by using the Farady rotator produced above. Both polarizer 1 and analyzer 2 used were glass polarizing plates. A magnetic field having the same intensity used above was applied to the resulting optical isolator to determine the light-extinction ratio and the insertion loss which were found to be 41 dB and 0.15 dB respectively for the light having a wavelength of 1550 nm. The optical isolator showed good light-extinction ratio over a wide wavelength range. The light-extinction ratio of not less than 30 dB could be obtained over a wavelength range of from 1530 to 1630 nm.

COMPARATIVE EXAMPLE 9

A crystal of $Y_{2.00}Bi_{1.00}Fe_5O_{12}$ was grown and deposited on a 50 mm$\Phi$ plane of a paramagnetic garnet substrate having a size of 50 mm$\Phi \times 0.5$ mmt through liquid phase epitaxy technique in a thickness of about 220 $\mu$m. The resulting crystal was cut to give a piece, then ground to give a crystalline piece having a size of 1 mm$\Phi \times 0.2$ mmt, followed by mirror finishing of the 1 mm$\Phi$ plane and application of an antireflection coating onto the mirror-finished plane to give a Farady rotator. The resulting Farady rotator had a rotational angle of the plane of polarization for light having a wavelength ($\lambda$) of 1550 nm equal to 45° in a magnetic field of 1800 Oe.

Further, an optical isolator as shown in FIG. 1 was made on an experimental basis using the Farady rotator thus produced. Both polarizer 1 and analyzer 2 used were glass polarizing plates. A magnetic field having the same intensity used above was applied onto the resulting optical isolator to determine the light-extinction ratio and the insertion loss which were 40 dB and 0.3 dB respectively for the light having a wavelength of 1550 nm. Moreover, the light-extinction ratio of not less than 30 dB could be observed over a wavelength range of from 1530 to 1630 nm.

EXAMPLE 14

A crystal of $Y_{2.7}Bi_{0.3}Fe_{4.8}Ga_{0.2}O_{12}$ was grown and deposited on a 25 mm$\Phi$ plane of a paramagnetic garnet substrate having a size of 25 mm$\Phi \times 1.0$ mmt through liquid phase epitaxy technique in a thickness of about 2600 $\mu$m. The resulting crystal was cut to give a piece, then ground to give a crystalline piece having a size of 3 mm $\Phi \times 2.55$ mmt, followed by mirror finishing of the 3 mm$\Phi$ plane and application of an antireflection coating onto the mirror-finished plane to give a Farady rotator. The resulting Farady rotator had a rotational angle of the plane of polarization for the light having a wavelength ($\lambda$) of 1550 nm equal to 45° in a magnetic field of 1500 Oe.

Further, an optical isolator as shown in FIG. 1 was made on an experimental basis using the Farady rotator thus produced. Both polarizer 1 and analyzer 2 used were glass polarizing plates. A magnetic field having the same intensity used above was applied onto the resulting optical isolator to determine the light-extinction ratio and the insertion loss which were 41 dB and 0.15 dB respectively for the light having a wavelength of 1550 nm. Moreover, this optical isolator showed good light-extinction ability over a wide wavelength range. The light-extinction ratio of not less than 30 dB could be observed over a wavelength range of from 1520 to 1570 nm.

EXAMPLE 15

A crystal of $Y_{2.2}Lu_{0.5}Bi_{0.3}Fe_{4.9}Ga_{0.1}O_{12}$ was grown and deposited on a 25 mm $\Phi$ plane of a paramagnetic garnet substrate having a size of 25 mm $\Phi \times 1.0$ mmt through liquid phase epitaxy technique in a thickness of about 1300 $\mu$m. The resulting crystal was cut to give a piece, then ground to give a crystalline piece having a size of 3 mm $\Phi \times 1.2$ mmt, followed by mirror finishing of the 3 mm $\Phi$ plane and application of an antireflection coating onto the mirror-finished plane to give a Farady rotator. The resulting Farady rotator had a rotational angle of the plane of polarization for the light having a wavelength ($\lambda$) of 1550 nm equal to 45° in a magnetic field of 1600 Oe.

Further, an optical isolator as shown in FIG. 1 was made on an experimental basis by using the Farady rotator thus produced. Both polarizer 1 and analyzer 2 used were crystalline plates of rutile. A magnetic field having the same intensity used above was applied onto the resulting optical isolator to determine the light-extinction ratio and the insertion loss which were 41 dB and 0.40 dB respectively for the light having a wavelength of 1550 nm. Moreover, this optical isolator showed good light-extinction ability over a wide wavelength range. The light-extinction ratio of not less than 30 dB could be observed over a wavelength range of from 1520 to 1570 nm.

In the foregoing Examples, the Farady rotators were produced by depositing or growing a garnet crystal on a paramagnetic garnet substrate through liquid phase epitaxy technique, but the substrate is not restricted to such a garnet substrate and the method for growing a garnet crystal on the substrate is not likewise limited to the liquid phase epitaxy technique. When GGG (gadolinium-gallium-garnet) crystalline plate is used as a substrate, the substitution element for the garnet crystal to be grown on the GGG substrate is at least one element selected from the group consisting of Er, Tm and Yb.

The present invention can likewise be applied to multi-stage type optical isolators in addition to single-stage optical isolators as shown in FIG. 1.

What is claimed is:

1. An optical isolator which comprises a polarizer, a Farady rotator and an analyzer arranged in this order, wherein the Farady rotator has a garnet crystalline structure represented by the following compositional formula (1):

$$(Tb_{1-(a+b)}Ln_aBi_b)_3(Fe_{1-c}M_c)_5O_{12} \qquad (1)$$

(wherein Ln represents at least one element selected from the group consisting of rare earth elements other than Tb; $0 < a \leq 0.6$; $0 < b \leq 0.2$; M represents at least one element selected from the group consisting of Al and Ga; and $0 \leq c < 0.1$).

2. The optical isolator according to claim 1 wherein the Farady rotator is a garnet crystalline structure which is represented by the foregoing compositional formula (1) and which is grown on a garnet substrate, and the optical path of the Farady rotator meets the crystal growth direction.

3. An optical isolator which comprises a polarizer, a Farady rotator and an analyzer arranged in this order, wherein the Farady rotator has a garnet crystalline structure represented by the following compositional formula (2):

$$(Tb_{1-(d+e+b)}Ln_dEu_eBi_b)_3(Fe_{1-c}M_c)_5O_{12} \qquad (2)$$

(Wherein Ln represents at least one element selected from the group consisting of rare earth elements other than Tb and Eu; $0 < d < 0.6$; $0 < e \leq 0.2$; $0 < d+e \leq 0.6$; $0 < b \leq 0.2$; M represents at least one element selected form the group consisting of Al and Ga; and $0 \leq c < 0.1$).

4. The optical isolator according to claim 3 wherein the Farady rotator is a garnet crystalline structure which is represented by the foregoing compositional formula (2) and which is grown on a garnet substrate, and the optical path of the Farady rotator meets the crystal growth direction.

5. An optical isolator which comprises a polarizer, a Farady rotator and an analyzer arranged in this order, wherein the Farady rotator has a garnet crystalline structure represented by the following compositional formula (3):

$$(Y_{1-(a+b)}Ln_aBi_b)_3(Fe_{1-(c+d)}M_cTi_d)_5O_{12} \qquad (3)$$

(Wherein Ln represents at least one element selected from the group consisting of Er, Tm, Yb and Lu; $0 < a \leq 0.4$; $0 < b \leq 0.1$; M represents at least one element selected from the group consisting of Al and Ga; $0 \leq c \leq 0.1$; $0 \leq d \leq 0.01$).

6. The optical isolator according to claim 5 wherein the Farady rotator is a garnet crystalline structure which is represented by the foregoing compositional formula (3) and which is grown on a garnet substrate, and the optical path of the Farady rotator meets the crystal growth direction.

* * * * *

UNITED STATES PATENT AND TRADEMARK OFFICE
CERTIFICATE OF CORRECTION

PATENT NO. : 5,198,923

DATED : March 30, 1993

INVENTOR(S) : Toshiaki Watanabe, et al

It is certified that error appears in the above-identified patent and that said Letters Patent is hereby corrected as shown below:

On the title page, Item [75] Inventors: the second Inventor's name should read --Toshihiko Ryuo--

Signed and Sealed this

Twenty-third Day of November, 1993

Attest:

BRUCE LEHMAN

Attesting Officer   Commissioner of Patents and Trademarks